US007114157B2

(12) United States Patent
Chaffee et al.

(10) Patent No.: US 7,114,157 B2
(45) Date of Patent: Sep. 26, 2006

(54) SYSTEM CONTROLLING EXCLUSIVE ACCESS BY CONTROL PROGRAMS TO SYSTEM RESOURCES

(75) Inventors: Michael C. Chaffee, Portland, MI (US); Edward Volcic, Rochester Hills, MI (US); Kenneth A. Stoddard, Rochester, MI (US); R. William Kneifel, II, Rochester Hills, MI (US)

(73) Assignee: Kuka Roboter GmbH, Augsburg (DE)

( * ) Notice: Subject to any disclaimer, the term of this patent is extended or adjusted under 35 U.S.C. 154(b) by 722 days.

(21) Appl. No.: 09/993,493

(22) Filed: Nov. 27, 2001

(65) Prior Publication Data

US 2003/0100957 A1 May 29, 2003

(51) Int. Cl.
 G06F 9/46 (2006.01)
 G06F 15/16 (2006.01)
 G06F 3/00 (2006.01)
 G06F 12/00 (2006.01)
 G06F 19/00 (2006.01)
 G06Q 19/00 (2006.01)
(52) U.S. Cl. .................. 718/104; 709/223; 710/36; 710/200; 719/330; 700/100; 705/4
(58) Field of Classification Search ........ 718/100–108; 709/223; 710/36, 200; 714/11; 705/4; 700/100
See application file for complete search history.

(56) References Cited

U.S. PATENT DOCUMENTS

| 4,574,350 A | * | 3/1986 | Starr .......................... 710/200 |
| 5,150,026 A | | 9/1992 | Seraji et al. ........... 318/568.11 |
| 5,150,452 A | | 9/1992 | Pollack et al. ............. 395/518 |
| 5,204,942 A | | 4/1993 | Otera et al. |
| 5,227,707 A | | 7/1993 | Mitomi et al. ........... 318/568.1 |
| 5,247,608 A | | 9/1993 | Flemming et al. ............ 395/90 |
| 5,347,459 A | | 9/1994 | Greenspan et al. ......... 364/461 |
| 5,561,742 A | | 10/1996 | Terada et al. ................. 395/90 |

(Continued)

FOREIGN PATENT DOCUMENTS

EP 0433522 A1 6/1991

OTHER PUBLICATIONS

European Patent Office, European Search Report in Corresponding EP 02025293, Mar. 21, 2006.

(Continued)

*Primary Examiner*—Meng-Al T. An
*Assistant Examiner*—Jennifer N. To
(74) *Attorney, Agent, or Firm*—Wood, Herron & Evans, L.L.P.

(57) ABSTRACT

The present invention is a system for controlling exclusive access by control programs (30) to system resources (52). A system in accordance with the invention includes a plurality of addressable locations (12, 14, 16, 18, 20 and 22) in the system; a communication system (24) connecting the addressable locations which transmits communications between the addressable locations; a plurality of machines (26), the machines being located at at least one of the addressable locations; a plurality of control programs which use resources including a plurality of machine control programs, each machine control program controlling at least one machine; and a plurality of resource managers (32), the resource managers being located at a plurality of the addressable locations, each resource manager communicating over the communication system with at least one other resource manager, and the plurality of resource managers arbitrating which control program of the plurality of control programs is given exclusive use of at least one resource during execution of the control program.

33 Claims, 6 Drawing Sheets

U.S. PATENT DOCUMENTS

| | | | |
|---|---|---|---|
| 5,570,285 A | 10/1996 | Asaka et al. | 364/424.02 |
| 5,774,731 A * | 6/1998 | Higuchi et al. | 710/200 |
| 5,798,627 A | 8/1998 | Gilliland et al. | 318/568.14 |
| 5,825,981 A | 10/1998 | Matsuda | |
| 5,953,229 A * | 9/1999 | Clark et al. | 700/100 |
| 5,999,881 A | 12/1999 | Law et al. | 701/301 |
| 6,004,016 A | 12/1999 | Spector | 364/167.02 |
| 6,049,756 A | 4/2000 | Libby | 701/301 |
| 6,212,444 B1 | 4/2001 | Kato et al. | 700/255 |
| 6,247,143 B1 * | 6/2001 | Williams | 714/11 |
| 6,263,358 B1 * | 7/2001 | Lee et al. | 718/100 |
| 6,321,337 B1 * | 11/2001 | Reshef et al. | 713/201 |
| 6,353,846 B1 * | 3/2002 | Fleeson | 718/104 |
| 6,549,961 B1 * | 4/2003 | Kloth | 710/36 |
| 6,742,015 B1 * | 5/2004 | Bowman-Amuah | 718/101 |
| 6,823,472 B1 * | 11/2004 | DeKoning et al. | 714/10 |
| 6,842,906 B1 * | 1/2005 | Bowman-Amuah | 719/330 |
| 6,961,763 B1 * | 11/2005 | Wang et al. | 709/223 |
| 6,983,253 B1 * | 1/2006 | Maul et al. | 705/4 |
| 2002/0165896 A1* | 11/2002 | Kim | 709/102 |

OTHER PUBLICATIONS

Lin G Y et al Institute of Electrical and Electronics Engineers: "An Agent-based Flexible Routing Manufacturing Control Simulation System," Lake Buena Vista, Dec. 11-14, 1994, pp. 970-977, XP010305840.

* cited by examiner

FIG. 3

LIST OF POSSIBLE RESOURCES:
- PHYSICAL WORKSPACE ~60
- SHARED I/O ~62
- TRANSPORT DEVICES ~64
- CHANGEABLE TOOLING ~66
- SENSOR SYSTEMS ~68
- PROCESS STATIONS ~70
- END OF ARM TOOLING ~72
- TECHNOLOGY CONTROLLERS ~74

SYSTEM CONTROLLING EXCLUSIVE ACCESS BY CONTROL PROGRAMS TO SYSTEM RESOURCES

BACKGROUND OF THE INVENTION

1. Field of the Invention

The present invention relates to systems which control machines or processes to share common resources and more particularly, to a system which controls machines or processes so one machine or process control program at a time is given exclusive use of at least one resource.

2. Description of the Prior Art

FIG. 1 shows the prior art interlock mechanism used in traditional robotic and other machine control applications. Two robots, A and B, for example, are interconnected not directly, but via a programmable logic controller (PLC). The actual interlock logic is inside the PLC, and the two robots use discrete I/O to communicate with the PLC.

When Robot A wishes to acquire the protected resource (in this example, the resource is a shared workspace), it sets Request A true. Robot B does the same. However, the PLC only permits one grant line to go true. One robot can proceed while the other waits for its grant to go true. In this way, there is presumably no collision between the two robots.

However, this mechanism has several drawbacks in actual practice:

1) PLC scan time causes timing problems.—When either side uses a resource, then its request line is cleared (OUT Request X=FALSE) at the end of the program section, the Grant line for that robot does not immediately go false. It will go false after the next PLC logic scan. If the same program loops back to retake the resource before the grant line goes false, the program will continue thinking the resource is available. After the scan delay, the PLC will grant control to the opposite side, and both sides will assume the resource simultaneously. If that resource is a shared workspace for example, the two robots will collide in that workspace. This problem is typically solved with delays built into the robot programs, making them inefficient.

2) Request and Wait are not atomic—The real problem in item 1 above is that with simple I/O communication with the PLC, the request operation and the wait for operation are not atomic (indivisible). In fact the wait for may return as a result of a previous request, not for the current request. The concept of a mutex (mutual exclusion) object is well known in computer science and well known in computer programming. Using such a mechanism, a program typically requests a resource, and the arbitrator for the mutex does not return from the request until the resource is available. By using a function call to both request the resource and return ownership of the resource, these operations are indivisible from the program's point of view. In this case the PLC does implement a proper mutex. However, the two robot controllers communicate with the PLC via simple I/O bits, and the atomic nature of the mutex operations is destroyed.

3) Only two programs can share a resource.—The interlock technique described here and commonly used in the industry only permits two programs to share the resource. If more than two programs need to share the resource, then more complicated PLC logic must be used for that special case.

4) Deadlock detection—When multiple programs share multiple resources, it is possible for two or more programs to end up in deadlock, with each program owning a resource while needing one owned by another. The PLC I/O interlock technique typically used in industry provides no way to detect this deadlock situation and considerable debugging time is often needed to find the problem.

5) Deadlock prevention—There are well known techniques from computer science for both detecting and helping to prevent deadlocks. However, the PLC I/O interlock technique has no way to implement these techniques. Computer operating systems provide various mutex mechanisms for multiple programs running on a single computer. In multi-processor systems, the operating system for the multi-processor system provides some mutex mechanism for sharing resources between programs on the system. However, there is no existing system that provides for a reliable interlock mechanism that solves all the above listed problems for control programs running on separate controllers connected only by a standard communications network and with potentially disparate operating systems on the separate controllers.

U.S. Pat. No. 6,212,444 entitled "Method of avoiding interference of industrial robot" discloses a distance based method of avoiding the collision of a robot with another robot or cooperating apparatus. Each robot or device senses its own entrance into a commonly defined geometric region either by command or by interpolation along a path. When entering a region, each robot or apparatus sends a signal to prevent the other from entering, by causing it to stop and wait.

The method of U.S. Pat. No. 6,212,444 has disadvantages, some common to the prior art of FIG. 1 discussed above:

1) The signals sent between the robot and cooperating apparatus do not implement a mutually exclusive interlock. Though a collision is avoided, a potential deadlock is not. This type of deadlock is possible because there is no arbitrator to assign ownership of the shared resource. Thus, each apparatus can be stopped by the other, and each will wait forever for the other to proceed.

2) The method is based only on distance of the machines. The method cannot be used for arbitrary resource sharing.

3) There is no deadlock detection or prevention mechanism.

SUMMARY OF THE INVENTION

The present invention provides in a system of machines or processes coordinated asynchronous sharing of diverse resources by control programs and machine or process control programs such as, but not limited to, mutual workspaces among robots. Sharing is coordinated by having resource managers in the system communicate directly with each other to request and relinquish resources to a control program.

Furthermore, the resource manager identifies potential deadlock of resources shared by multiple programs by each program of the set of multiple programs acquiring sets of resources in a set order. When the control program is finished with the resources, the resources are released to be available to other programs. The writing of control programs that always acquire resources in the same order totally prevents deadlock.

A system in accordance with the invention includes a plurality of addressable locations in the system; a communication system connecting the addressable locations which transmits communications between the addressable locations; a plurality of machines or processes, the machines or processes being located at at least one of the addressable locations; a plurality of control programs which use resources including a plurality of machine or process control programs, each machine or process control program controlling at least one machine or process; and a plurality of resource managers, the resource managers being located at a plurality of the addressable locations, each resource manager communicating over the communication system with at least one other resource manager, and the plurality of resource managers arbitrating which control program of the plurality of control programs is given exclusive use of at least one resource during execution of the control program. The at least one resource may be a physical workspace that is at least in part shared by at least two machines. The physical workspace may be defined logically. The at least one resource may be control of an input/output function shared between the machines. The at least one resource may effect transport of items processed by the machines. The at least one resource may be control of exchange of tools used by the machines. The at least one resource may be control of processing performed at processing stations in a manufacturing process. The at least one resource may be use of a sensor system. The control program may be executed by a computer located at an addressable location in the system. The computer may comprise a general purpose industrial computer, a personal computer, a machine controller or a programmable logic controller.

At least one resource manager may be executed by a computer located at an addressable location in the system and the computer may comprise a general purpose industrial computer, a personal computer, or a machine controller. The resource may be controlled locally by a resource manager at the same addressable location as the control program. The control program may use a resource that is controlled remotely by a resource manager at an addressable location different from the control program. The at least one resource may comprise a data object.

A human machine interface may be coupled to at least one resource manager, which provides a point of access to the at least one resource manager, to permit establishing of the resources under control of the at least one resource manager, to observe a state of the resources under the control of the at least one resource manager and to modify a state of the resources under the control of the at least one resource manager. The human machine interface may be local to at least one of the resource managers. The human machine interface may have access to at least one resource manager through at least one other resource manager. The human machine interface may be remote from the at least one of the machines controlled by the at least one resource manager.

During arbitration, at least one resource manager may communicate over the communication system to another resource manager which is associated with at least some of the plurality of control programs. Each resource manager may arbitrate access to a plurality of resources with access to the plurality of resources being in a set order. Each resource manager may track each control program requesting control of the resources and in what order; and if a control program requests access to at least two resources out of the set order, a warning may be issued that a deadlock between the control program requesting access to the at least two resources and another control program is possible. The plurality of resource managers may collaborate to determine if a set of machine control programs requesting access to a set of resources is found to form a deadlock and then the deadlock state is communicated to the user. The plurality of machines may be robots which share a plurality of workspaces which may be at least in part located within a mutual workspace. The control program may include user programmable instructions to the plurality of resource managers to control the state of the at least one resource. The communication system may be a wireless system or a wire line system and the wire line system may be an Ethernet system.

A system in accordance with the invention further includes a plurality of addressable locations in the system; a communication system connecting the addressable location which transmits communications between the addressable locations; a plurality of machines or processes, the machines or processes being located at at least one of the addressable locations; a group of control programs including a plurality of machine or process control programs, each machine or process control program controlling at least one machine or process; and a plurality of resource managers, the resource managers being located at a plurality of the addressable locations, each resource manager communicating over the communication system with at least one other resource manager, such that the resource managers implement at least one interlock on behalf of at least one resource, each interlock providing mutually exclusive use of at least one resource by one of the control program, each interlock being controlled by programmable instructions from within the one of the machine control programs. The instructions may be user instructions.

BRIEF DESCRIPTION OF THE DRAWINGS

FIG. 3 is a chart illustrating possible resources which may be controlled with a resource manager in accordance with the present invention.

Like reference numerals identify like parts throughout the drawings.

DESCRIPTION OF THE PREFERRED EMBODIMENTS

Figure 2:
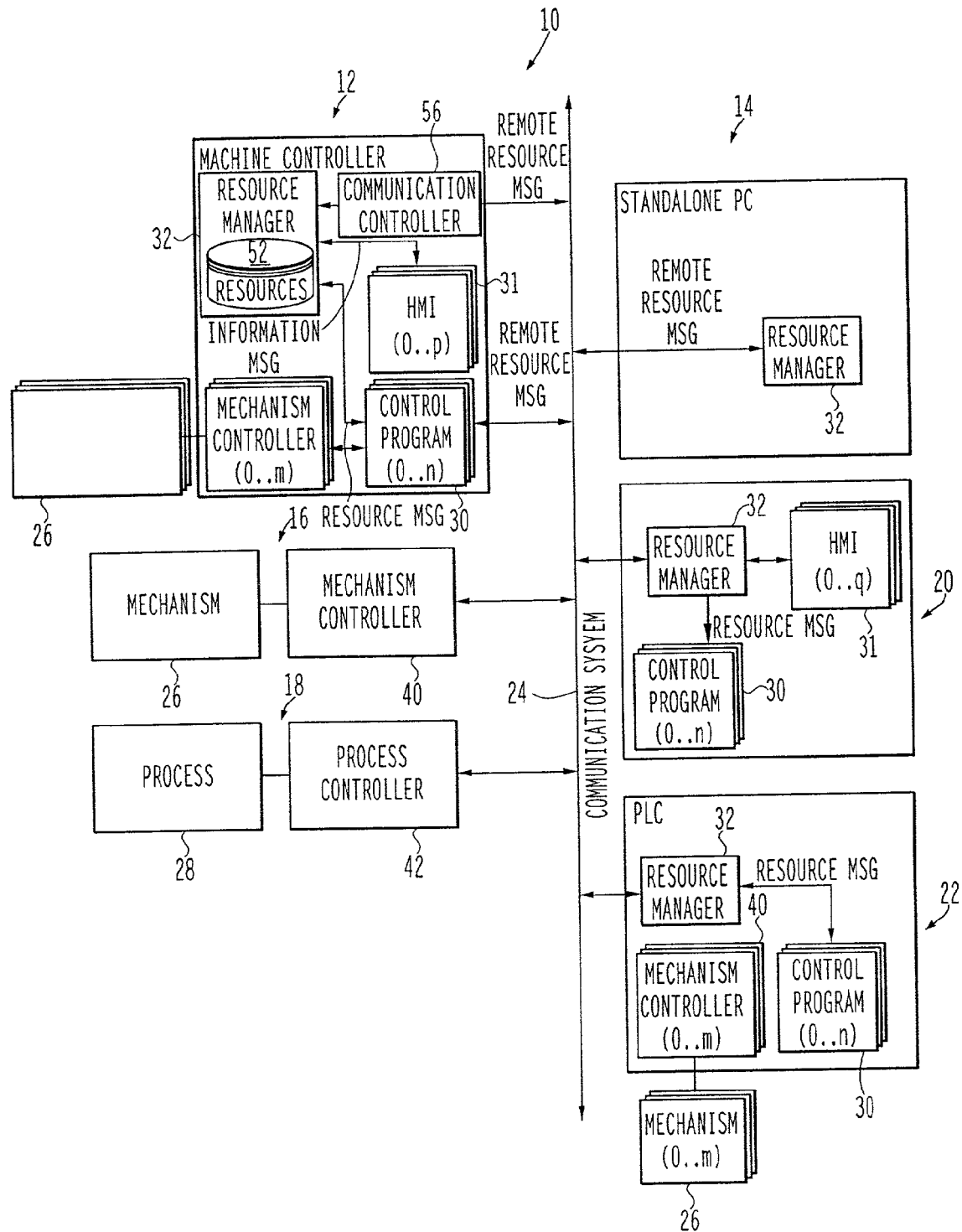
FIG. 2 is a block diagram of a system in accordance with the present invention.

FIG. 2 illustrates a system 10 in accordance with the present invention. The system 10 includes a plurality of addressable locations 12–22 which are connected together by a communications system 24 which may be a wireless system or a wireline system. The addressable locations which have resource managers are described as nodes. At many of the addressable locations 12–22 is located a mechanism which may be a machine or an industrial process 28 which is controlled by a mechanism controller 40 or a process controller 42. A plurality of control programs 30 are located at many of the addressable locations. Resource managers 32 are located at many of the addressable locations. The control programs 30 use the resources 52 associated with the resource manager 32 as discussed below in conjunction with FIG. 3 and include a plurality of machine control or process control programs with each machine control program controlling at least one mechanism or machine 26 and each process control program controlling at least one process 28. It should be understood that the resources 52 have been illustrated at only addressable location 12, but are associated with each resource manager 32.

The plurality or resource managers 32 in the system 10 are located at a plurality of the addressable locations 12,14, 20 and 22. In accordance with the invention, it is not necessary that a resource manager be located at each of the addressable locations. Each resource manager 32 communicates by use of the communication controller 56 over the communication system 24 with at least one other resource manager. Only a single communication controller 56 has been illustrated at addressable location 12 but are associated with each resource manager 32. The resource managers 32 arbitrate which control program of the plurality of control programs 30 is given exclusive use of at least one resource during execution of the control program. Only after the control program which is given exclusive use of the resource is finished using the resource, is the resource released for use by other control programs. It should be understood that the control programs are a mixture of machine control programs and/or process control programs and other programs which respectively provide direct control of machines or mechanisms 26 and processes 28 or more general functions which do not involve the direct control of machines or processes. These more general functions can handle a variety of tasks that range from health and preventive maintenance functions to sensor based activities to tasks which are associated with maintenance of tools in the work cell. Although these more general functions do not directly control the machines or mechanisms and processes, they can vie for the shared resources. At some of the addressable locations 16 and 18, there is no resource manager and only a mechanism 26 and/or a process 28 respectively to be controlled by a mechanism controller 40 and/or a process controller 42. The control of the mechanism controller 40 and process controller 42 at addressable locations 16 and 18 is always performed remotely in view of there being no local resource manager 32 and control programs 30.

The addressable locations have specific functions. The functions at the addressable locations include a machine controller at addressable location 12, a stand alone PC at addressable location 14, and a PLC at addressable location 22 but, it should be understood that the invention is not limited to any particular form of computer at the addressable locations.

The resource managers 32 are each located at a node 50 and include resources 52 associated with the resource manager 32. The resource manager communicates with the control programs 30 by means of messaging which is internal to the resource manager node 50. Additionally, a human machine interface 54 communicates with the resource manager by means of internal messaging and provides a point of access to the at least one resource manager 32 to permit establishing of the resources under the control of the at least one resource manager to observe the state of resources under the control of the at least one resource manager and to modify the state of the resources under the control of the at least one resource manager. The communication controller 56 in a preferred embodiment utilizes the TCP/IP protocol for communications but the invention is not limited thereto. The communication system may be based upon the Ethernet specification. The mechanisms 26 or processes 28 are typically each a machine or group of machines or a process or a group of processes. As described above, the resource managers 32 throughout the system arbitrate which control program of the plurality of control programs 30 is given exclusive use of at least one resource 52 during execution of the control program. Each resource manager 32 may be remote from the addressable location at which the control programs 30 are located. As a result, either a local resource or a remote resource manager 32 will determine which control program of the plurality of control programs 30 has exclusive use over at least one of the resources 52.

FIG. 3 illustrates a chart of possible resources 52 which may be exclusively used by only one of the control programs 32 at any one time. Examples, without limitation, of possible resources are physical workspace 60 as described below in conjunction with FIG. 4, shared input/output 62, transport devices 64, changeable tooling 66, sensor systems 68, process station 70 and robot arm tooling 72 and technology controllers 74. The resources 52 may be associated with other than the control of machines or processes.

Figure 1:
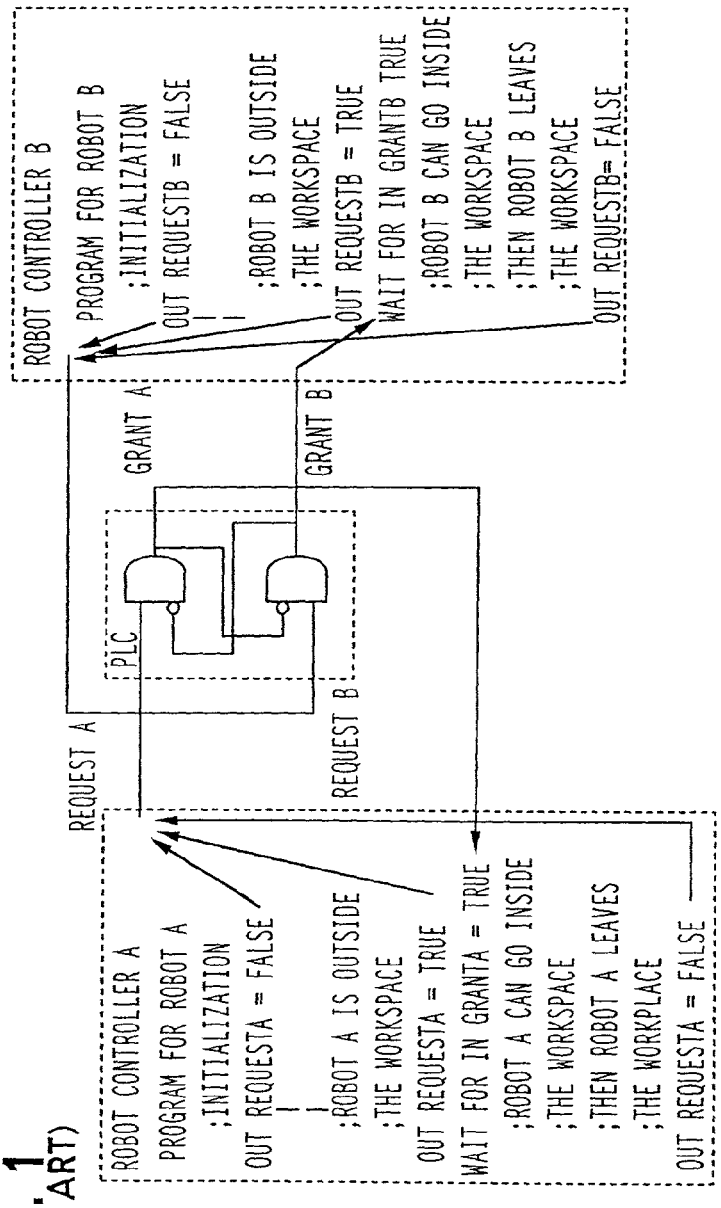
FIG. 1 is a block diagram of the prior art interlock mechanism used in traditional robotic and other machine control applications.
Figure 4:
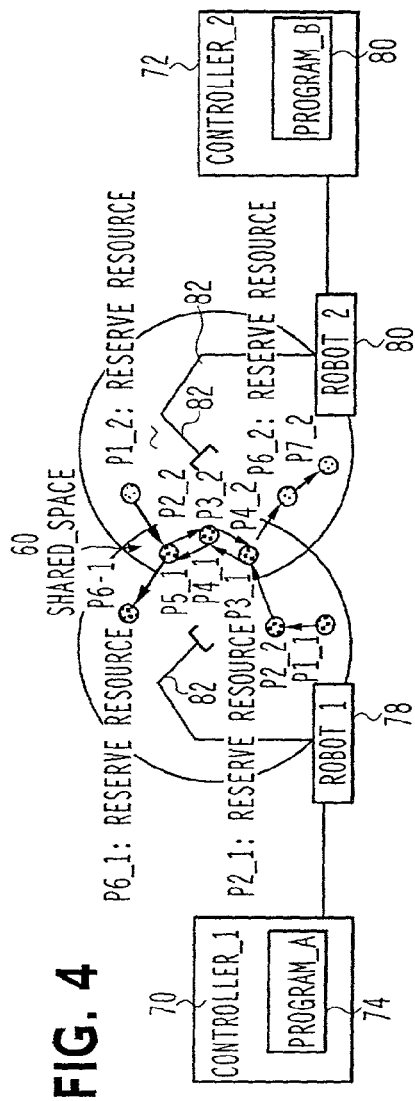
FIG. 4 is a block diagram of control provided by the present invention in which the resource is physically shared space accessed by two robots.

FIG. 4 illustrates a block diagram of logical sharing of physical workspace 60. There are often concerns that robots and/or payloads will collide within a cell during parts handling and process operations. This concern is growing as robot cells are becoming more densely packed. The collisions may be near the tool of the robot or the collisions may be between robots in opposing lines (e.g. robot "elbows" bumping into each other from behind). It is very desirable to reserve the physical workspace in a logical fashion from the user written control program. This insures that robots being controlled by separate control programs do not stray simultaneously into the same workspace.

With reference to FIG. 4, a first controller 70 and a second controller 72 respectively contain program 74 and program 76. The resource managers used in the system of FIG. 4 have been omitted and should be understood to be resident at and executed by the processors located at the first and second controller. One of the programs 74 and 76, in accordance with the invention, is assigned exclusive control of the workspace 60 so as to prevent this resource from being utilized by the other program. Robots 78 and 80 have robotic arms 82 which work in the shared workspace 60. The robot 78 works through a series of steps p1_1 through p6_1 while robot 80 works through a series of steps p1_2 through p7_2. As is seen, collision possibilities exist for steps p3_1 through p5_1 with p2_2 through p4_2. With the invention, each controller 70 and 72, through the action of a resource manager which may be located at the controller or remote there from in accordance with the block diagram of FIG. 2 assigns exclusive use by program 74 or program 76 to the shared workspace 60 in the fashion of an interlock to prevent the other program from simultaneously sharing that workspace. As is seen from the steps of robot 78, the reservation of the workspace 60 occurs at step p2_1 and the release thereof occurs at step p6_1 which prevents the program 76 from having control thereof through the action of robot 80. Similarly, the action of robot 80 reserves the workspace 60 at step p1_2 and releases it at step p6_2 which locks out program 74 from obtaining access.

If both robots 78 and 80 move to positions within the shared space 60 at the same time, a crash would be imminent. By defining a workspace 60 for the shared physical space and then requiring each of the programs to first own the workspace before actually entering the shared space, the robots are prevented from entering the shared space 60 at the same time. As is seen, the owning of the shared workspace 60 for robot 1 occurs at step p2_1 and the owning of the resource for robot 80 occurs at p1_2.

Each resource manager is located at a resource manager node (RMN). The set of RMN are connected over the aforementioned communication system 24. Each RMN runs on a separate processor and the resource manager 32 therein arbitrates requests for the resources it manages as it receives them. The control programs 30 typically also execute on the same processor which runs the resource manager. The RMN is a central component of the shared resource interlock feature of the present invention. Generally, the RMN can be a controller (e.g. robot controller), a computer (stand alone PC), or a PLC. Generally, each RMN contains a single resource manager 32, a set of control programs 30 (controlling a set of mechanisms or processes or entities which are not mechanisms or processes), and a set of Human Machine Interfaces (HMI) 31 (to provide information to the end-user and to permit setup of the resources to be managed). The resource manager 32 at each RMN communications with the control programs 30 and the HMIs 31 at the same RMN through internal messaging as described above. The resource manager 32 also communicates with other resource managers through messages via the communication controller 56 over the communication system 24 which preferably are sent by using, but not limited to, the TCP/IP protocol.

The resource managers 32 have four primary functions: (i) manager and process requests for resources 52 that the resource manager is responsible for as well as identifying when the resources are acquired out of order as discussed below in conjunction with FIG. 7; (ii) communicate requests for resources that the other resource managers are responsible for; (iii) provide information on resources that the resource manager manages; and (iv) identify deadlock programs and resources.

Each resource manager 32 may be configured to manage a set of unique resources, such as those described above in conjunction with FIG. 3 (unique within the set of interconnected RMNs). When the resource manager 32 receives requests for these resources, the resource manager grants them by first in, first out basis. Because a single resource manager 32 has control of each resource 52, that resource manager can keep track of what program request obtains the resource and in what order. Also, working collaboratively, the resource managers together can determine in what order each program requests multiple resources. If a program requests two or more resources out of order, a warning is issued that a deadlock is possible as is described below in conjunction with FIG. 7. The order is arbitrary and can be established by the programmer, but once established, all programs should use the same order or the warning will occur. If a deadlock occurs, the resource manager can determine exactly what programs/controllers are involved in the deadlock and what resources are involved.

A resource is defined as a logical entity that can be owned by only one program at any one time. Any other program wishing to own the resource is queued until a time at which the resource is freed by the current owner. The queue works on a first in, first out basis.

The control programs 30 use a set of specific commands that allow reserving and releasing resources as respectively discussed below in conjunction with FIGS. 5 and 6 that are managed by a local resource manager or by a remote resource manager. When the specific commands are executed, an internal message is sent to the resource manager for processing. A program running on any controller can request the use of a resource from the resource manager and will wait at that request for response given that program ownership.

Each HMI 31 uses internal messaging to determine the state of a desired resource that is managed locally (what program owns the resource and what programs are queued for the resource) and external messaging to determine the state of resources managed remotely. Each HMI 31 also is a component at which a deadlock detection process is initiated.

While the invention is practiced with communication systems 24 of diverse designs including wireless and wire line forms, a preferred form of the present invention uses the communication systems based upon the Ethernet specification.

In accordance with the present invention, management of resources may be performed centrally or in a distributed manner as illustrated in FIG. 2. Utilization of a central manager has one RMN node that is responsible for managing all of the resources defined for a set of RMNs connected by a communication system 24. All other RMNs do not manage resources and merely act as a facilitator forwarding resource requests to the RMN that contains the resource manager managing desired resource. A distributed resource manager model may be used as an alternative to central management of resources for managing access to a set of resources 52. In this circumstance on each controller the user defines a set of locally managed resources as well as a set of remotely managed resources. Each controller receives requests for the resources that the controller manages and sends requests to remotely managed resources requested by local programs 30.

Deadlock, as discussed above, is a situation where a circular dependency exists regarding the order in which resources 52 are acquired. Consider the example between two programs, one of which acquires resource A before acquiring resource B, and the other acquires resource B before acquiring resource A. Each program waits for the other resource to be released before releasing its own resource. The end result is that the programs simply wait with it being a necessity that the user needs to be able to easily detect this state. If a robot or a machine owns a resource that is not deadlocked, then the robots or machines queued for those resources are also not deadlocked. The queued robots can only be waiting. A robot waiting on a resource owned by a deadlocked robot is not deadlocked if it is not directly involved in the circular dependency. This robot is simply waiting.

When shared resource interlocks are used to mange resources accessed by multiple programs, the possibility of deadlock is always present. When deadlock occurs, the control program (and ultimately mechanisms) involved are in a state in which they will sit waiting until the problem is resolved. Deadlock detection identifies this error state but it does not help the user to avoid it. The recommended programming practices eliminate the problem of deadlock by having each program 30 requesting the resources 52 needed thereby in the same order. This requires that when multiple resources are acquired by any control program in a cell or other workspace, they are acquired in the same order. After the program is finished with the resources, it releases them making them available to other programs. If a program switches back and forth between a set of resources, it should acquire the full set in order. By writing programs that always acquire resources in the same order, deadlock is avoided entirely.

Each resource definition has a sequence number attached thereto. It is up to the user to assign sequence numbers to each resource. When a resource is taken out of order (i.e. a resource with lower sequence number is requested after one with a higher sequence number was granted), the HMI associated with the resource manager displays a warning message indicating a warning message to the user that the current state is vulnerable to deadlock. This does not mean that the control programs 30 are deadlocked, but merely that a deadlock is possible based upon the order that the resources were taken.

When programs are in a deadlocked state, an error message is logged and displayed on each controller with a program included in the deadlock state. The deadlocked programs, because they are each queued for resource 52, are waiting and the respective mechanism 26 or machine being controlled thereby are stopped. The operator has the option of stopping the deadlocked programs and manually releasing the resource 52 with the act of releasing the resource giving the next program 30 queued for the resource ownership thereof to eliminate the deadlock. The choice of the deadlocked program to be stopped is arbitrary and is left to the operator to decide.

A RESERVE message introduces a relationship between a resource 52 and a control program. When a control program 30 requests and is granted a resource 52, the resource is considered to be owned by the program. No other resources owned by the program are dependent on it. When a program 30 requests a resource owned by another program, a dependency is created. This dependency means that all previously acquired resources are dependent on the requested resource. All resources 52 remain dependent until the resource is granted. In other words, the program cannot execute any new statement until the resource 52 it is queued for is granted. For any program there can be at most one ongoing dependency at any one time. This is because each reserve request in a program is executed in the order they are processed.

Figure 5:
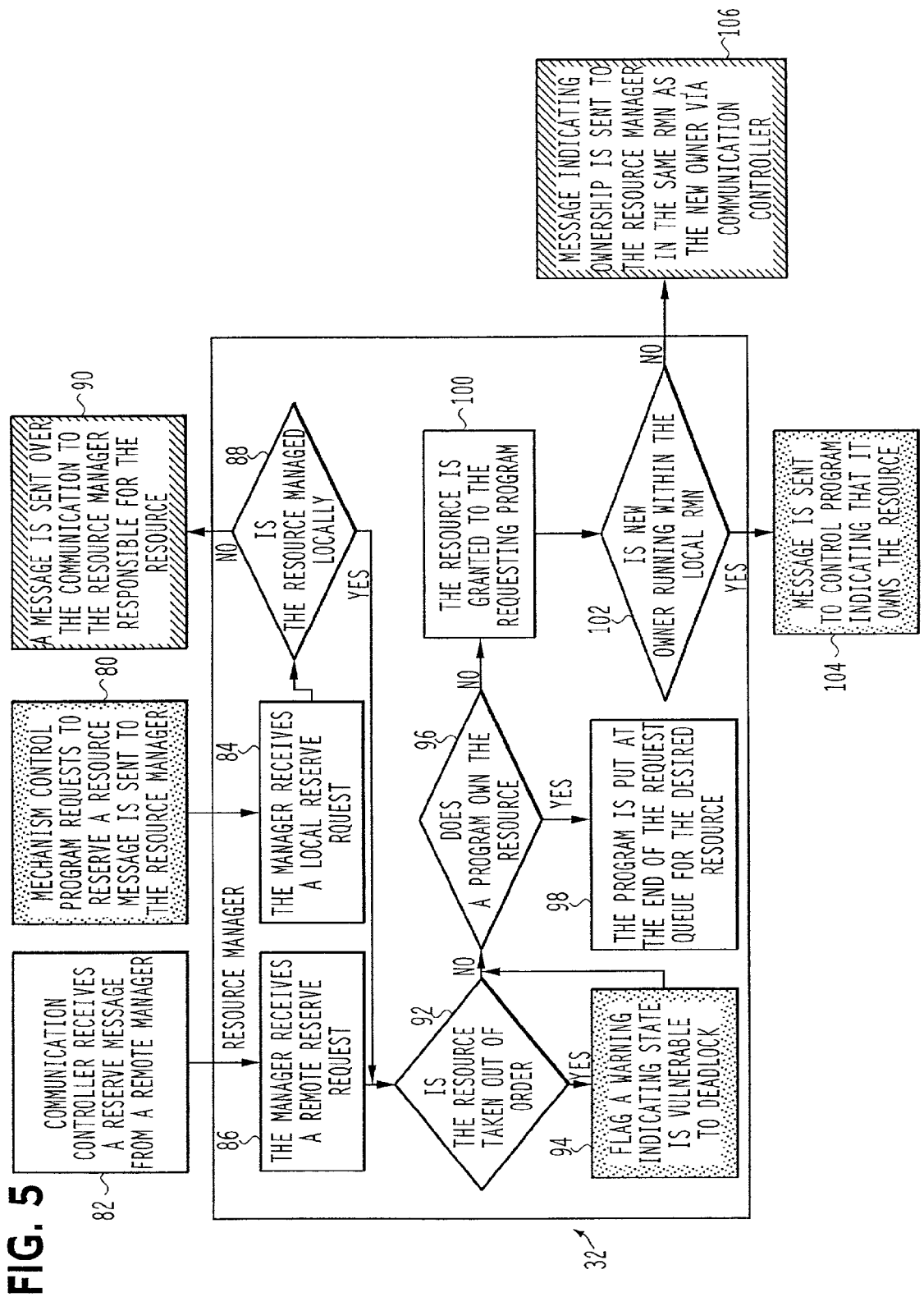
FIG. 5 is a flow chart illustrating the operation of a resource manager in reserving a resource.

FIG. 5 illustrates the processing of a RESERVE message which may be obtained from a local resource manager 32 as indicated at block 80 or a remote resource manager as indicated at block 82. The resource manager 32 is executed by a computer by receiving a RESERVE request respectively identified as steps 84 and 86. At step 84, the manager receives a local RESERVE request which is processed at decision point 88 to determine if the resource is managed locally. If the answer is "no", a message is sent over the communication system 24 to the resource manager responsible for the resource as indicated at block 90. On the other hand, at decision point 88, if the resource is determined to be managed locally, the program proceeds to decision point 92 which also receives the output from block 86 where the resource manager receives a remote RESERVE request. Decision point 92 determines if the resource is taken out of order. If the answer is "yes" at decision point 92, a warning flag 94 is set indicating that the state of the resource is vulnerable to deadlock. If the answer is "no" at decision point 92, or if the flag has been set at 94, the processing proceeds to decision point 96 where a determination is made if the program owns the resource. If the answer is "yes" at decision point 96, the processing proceeds to point 98 where the program is put at the end of the request queue for the desired resource. On the other hand, if the decision at decision point 96 is "no" that the program does not own the resource, processing proceeds to point 100 where the resource is granted to the requesting program. Processing proceeds from point 100 to decision point 102 where a determination is made, if the new owner running within the local resource manager node? If the answer is "yes" at decision point 102, processing proceeds to point 104 where a message is sent to the control program 30 that the program owns the resource. On the other hand, if the answer is "no" at decision point 102, the processing proceeds to point 106 where a message is generated indicating ownership is sent to the resource manager 32 in the same RMN as the new owner via communication controller 56.

A RELEASE message removes the ownership between the resource 52 and the program 30. If there are other programs queued, the resource 52 is granted to the next program 30 in the queue. This action removes the dependency between the queued program and the resource. In other words, the program is now free to continue execution.

Figure 6:
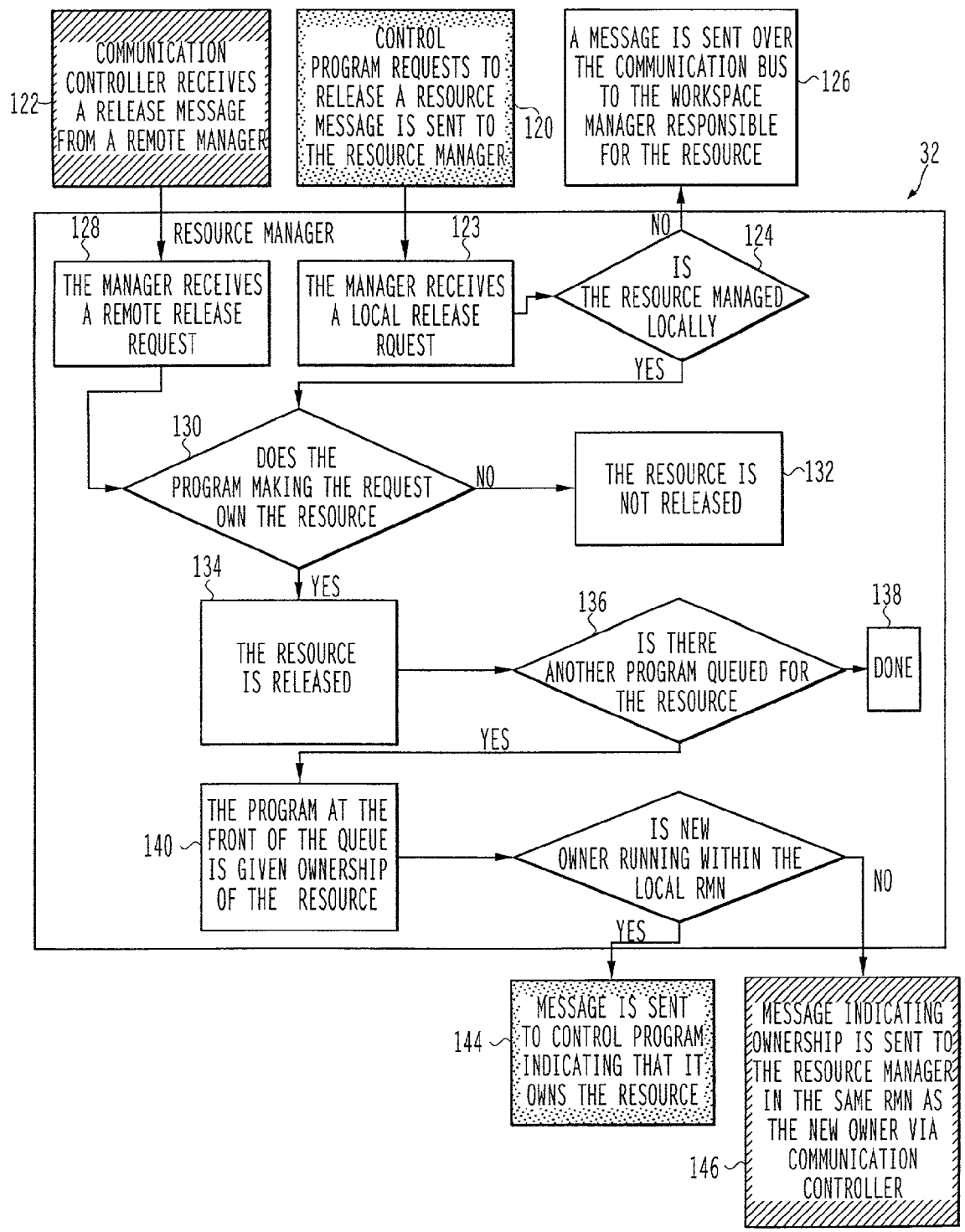
FIG. 6 is a flow chart illustrating the operation of a resource manager releasing a resource.

FIG. 6 illustrates processing by the resource manager 32 of RELEASE messages. The RELEASE messages may be generated locally by a control program 32 as indicated by block 120 or remotely as indicated by block 122. The local RELEASE message is received at block 123. Processing from block 123 proceeds to decision point 124 where a determination is made of whether the resource is managed locally. If the answer is "no", processing proceeds to block 126 where a message is sent over the communication system 24 to the resource manager 32 responsible for the resource. The remote RELEASE message is received at block 128 where processing proceeds to decision point 130. Decision point 130 receives inputs from the receipt of the remote release request block 128 and decision point 124. Decision point 130 determines if the program making the request owns the resource. If the answer is "no", processing proceeds to decision point 132. On the other hand, if the decision is "yes" at decision point 130, processing proceeds to point 134 where the resource is released. Thereafter, processing proceeds to decision point 136 where a determination is made if there is a another program queued for the resource. If the answer is "no", processing is finished as indicated by point 138 On the other hand, if the answer is "yes" at decision point 136, processing proceeds to point 140 where the program at the front of the queue is given ownership of the resource. Processing proceeds to decision point 142 where a determination is made of whether the new owner is running within the local resource manager node. If the answer is "yes", processing proceeds to point 144 where a message is sent to the control program 30 indicating that it owns the resource 51. On the other hand, if the determination is "no" at decision point 142, processing proceeds to point 146 where a message is generated indicating ownership is sent to the resource manager 32 in the same RMN as the new owner via the communication control 56.

When a user initiates a search for deadlocks, the resource manager sends out a message PROBE along the outgoing dependencies of any program running within the RMN. If there are no outgoing dependencies, there are no deadlocks. As the PROBE is received at each resource manager, information regarding ongoing dependencies thereof is added. If the PROBE reaches a resource manager 32 that has already forwarded the PROBE, this indicates that a deadlock exists. The information of the PROBE then allows the resource manager to determine what programs and resources are involved in the deadlock.

Figure 7:
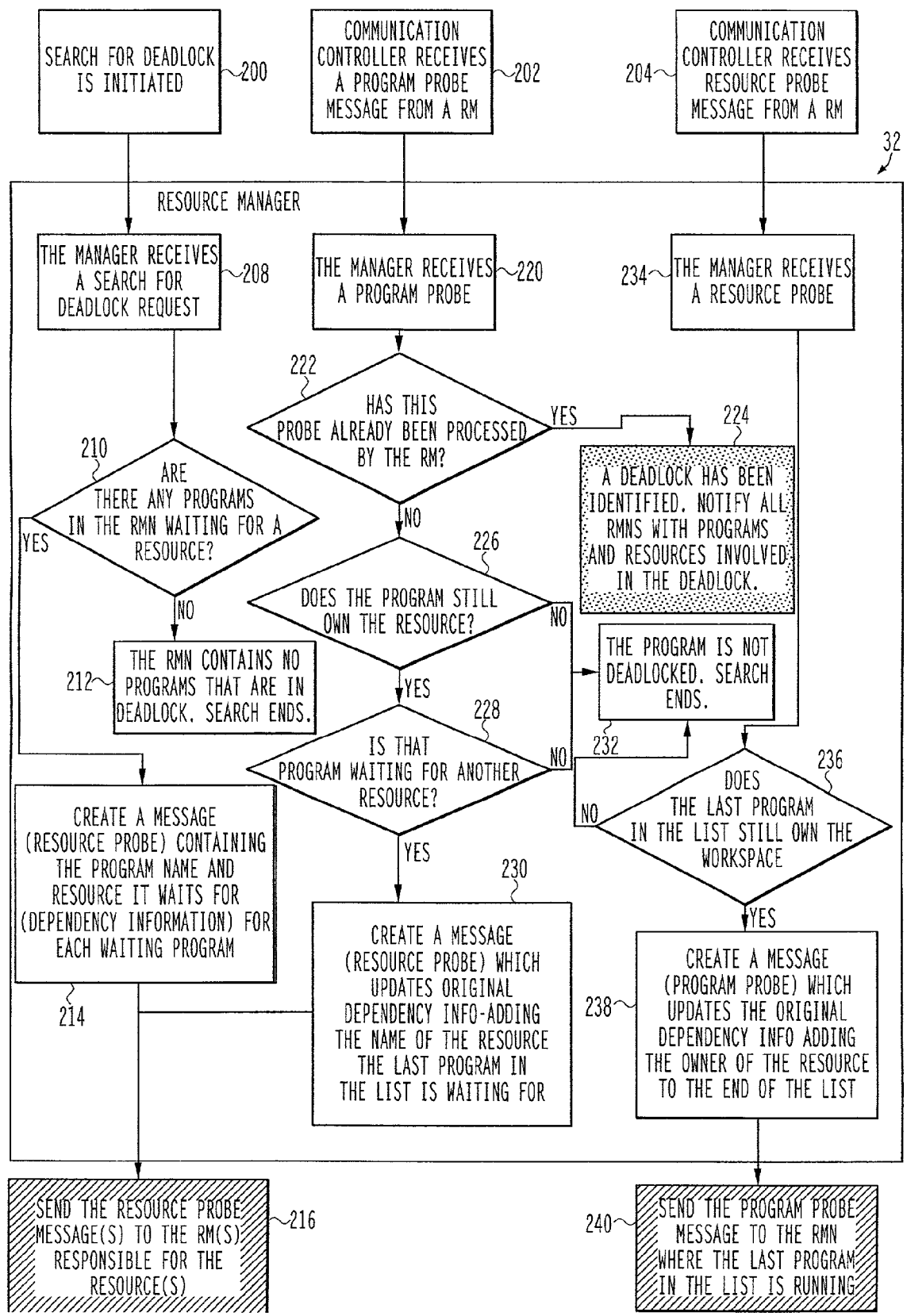
FIG. 7 is a flow chart illustrating a resource manager searching for deadlocks.

FIG. 7 illustrates the processing of the resource manager to detect deadlock. The processing to detect a deadlock begins in one of three ways which are first, the search for deadlock is initiated as indicated at block 200, communication controller 56 receives a programmed PROBE message from a resource manager as indicated at block 202, or communication controller 56 receives a resource PROBE message from a resource manager 32 as indicated at block 204. In response to a search for deadlock being initiated at block 200, processing proceeds to block 208 where the resource manager 32 receives a search for the deadlock request. Processing proceeds to decision point 210 where a determination is made if there are any programs 30 in the RMN waiting for a resource. If the answer is "no", processing proceeds to point 212 which is an end point as a result of the RMN containing no programs that are in the deadlock. If the answer is "yes" at decision point 210, processing proceeds to block 214 where a resource PROBE message is created containing the program name and resource 52 for which the program is waiting (dependency information) for each waiting program. Processing proceeds to block 216 where the resource PROBE is sent to the resource managers 32 responsible for the resources. The block 220 that the resource manager receives a program PROBE is in response to block 202. Processing proceeds to decision point 222 where a determination is made if the probe already has been processed by the resource manager. If the answer is "yes", processing proceeds to block 224 which represents that a deadlock has been detected and all of the RMNs with programs 30 and resources 52 involved in the deadlock are notified. If the answer is "no" at decision point 22, processing proceeds to decision point 226 where a determination is made, does the program 30 still own the resource 52? If the answer is "yes", processing proceeds to decision point 228 where a determination is made, is the program 30 waiting for another resource 52? If the answer is "yes", processing proceeds to block 230 where a resource probe message is created which updates original dependency information and adds the name of the resource the last program 30 in the list is waiting for which then proceeds to the previously described block 216. On the other hand, if either of the decisions at decision points 226 and 228 is "no", processing proceeds to end point 232. At point 234, the resource manager 32 receives a resource PROBE in response to the communication controller 56 receiving the resource probe message from a resource manager at block 204. Processing proceeds to decision point 236 where a determination is made if the last program in the list still owns the workspace. If the answer is "no", processing proceeds to endpoint 232. If the answer is "yes" at decision point 236 that the last program in the list still owns the workspace, processing proceeds to point 238 where a program PROBE message is created which updates the original dependency information adding the owner of the resource to the end of the list. The processing proceeds to point 240 where the program PROBE message sent to the RMN where the last program in the list is running.

The shared resource interlock feature of the invention makes control easy for resources by multiple controllers:

(a) Shared I/O

There may be a block of I/O points on a communications network (e.g., fieldbus, Ethernet, 802.11b wireless, etc.) that are used by multiple control programs. When used by multiple control programs in a mutually exclusive fashion, it is useful to reserve this block I/O resource prior to operating thereon by a first control program. When done, the first control program frees the blocking of I/O resource so that the I/O resource could be reserved and operated on by control program 2. This shared I/O block resource is associated with some device or process. In that case, the are embedded in an example below.

(b) Part Transport Devices (e.g., Turntable, Conveyor, etc.)

Multiple robots may need to coordinate with a part transport device such as a turntable or part shuttle. Since there are multiple control programs controlling the individual robots, it is convenient for one control program to exclusively use the transport resource at a time. The transport resource may be reserved by control program 1 and then indexed to the desired location in coordination with robot 1 without concern that other control programs interrupting the process. Then, after robot task completion, control program 1 frees the transport resource to be reserved and used by other control programs.

(c) Active Tools and Processes

Examples of active tools and processes are: grippers, weld guns, sealant dispenser, smart fixtures, de-burring, drilling, riveting, fastening, paint sprayer, sandblaster, wash down systems, etc.

(d) Fixed Process Tooling May be in a Workspace that is Shared by Multiple Robots.

For example, multiple robots may move automotive windshields under a single sealant dispensing head in turn. When this is an asynchronous process (e.g., the control programs for the various robots handling the windshields are not tightly synchronized in time), there is a need to ensure that only one control program manipulates the sealant dispensing tool flow at a time. This exclusive use can be achieved by reserving the sealant dispensing tool resource by a first control program prior to operation. Then, after the first control program has commanded the first robot to the appropriate position, turned on the sealant, modulated the flow proportional to the speed of the windshield motion under the sealant gun, and turned off the flow, the sealant gun resource can be released. At this point, the sealant dispensing tool resource is free to be reserved by another control program. In this example application, there is likely to be a physical workspace resource reservation associated with the location of the windshield and robot near the sealant dispensing tool.

(e) Combinations

A combination of resources can also be handled with a resource reservation. If, for example, one resource name is associated with a multiple tools and a physical zone, they could all be reserved simultaneously. An example is reserving a shared set of process tooling and physical zone, bringing a part into the process zone, performing process function A on the part, performing process function B on the part, performing process function C on the part, and removing the part from the physical zone. Instead of reserving the process functions. A, B. and C plus the physical workspace with independent reservations, the multiple resources may be grouped into a single "super resource" and reserved with a single reservation statement.

(f) Sensor Systems (Vision System, Laser Scanning System, Etc.)

In this context, sensor systems are just another type of tool. For example, a vision system that overlooks an area operated in by many robots, may need to be used by multiple control programs in an exclusive fashion. This may be easily be handled by reserving the vision system resource, moving the robot/part and taking coordinated pictures, using the vision system to make appropriate calculations, and freeing the vision system resource to make the vision system resource available to other control programs.

(g) Exchangeable Tools—Tool Store

Several robots work asynchronously in a cell sharing weld guns and part grippers with quick-change tooling. When a first control program wants a first robot to load tool A, the first control program first reserves the tool to ensure that it is not presently being used by a different robot. If the tool is "owned" by a different robot, the first control program pends until the tool A resource has been freed. If and/or when tool A resource has been freed, the first control program reserves tool A, commands robot 1 to move to tool A to the station and to load tool A. the first control program then commands the robot to perform operations with the tool, returns the tool to the holder thereof, moves the robot away from the holder and frees the tool A resource. At this time, the tool A resource is available to be used by other control programs.

(h) Automatic Resource Reservation

A somewhat different use of shared resource interlocking is when an automatic background program (not a machine or process control program) reserves a resource.

Case 1 (Use of the resource by both a background program and a control program)—Example of tool removed from tool store for maintenance: In the case where several robots automatically exchange tools with a tool store, the tools may be periodically removed for maintenance. A special automatic background program may reserve a tool resource when a tool is temporarily removed from the tool store for maintenance. This prohibits the control program commanding the robot from attempting to use a tool that is in the middle of maintenance.

Case 2 (automatic reservation of resource based on sensor or automation calculation task)—It may be interesting in some cases to have a control program communicate with a sensor task to reserve a resource when a measurement threshold is crossed (e.g., reserve workspace when distance to geometric region is less than 10 cm). In this case, the control program only triggers the sensor task to start monitoring and make the reservation if/when the threshold is crossed. The workspace resource would be reserved from the sensor task in this case and not from the control program even though the control program started the sensor task.

While the invention has been described in terms of its preferred embodiments, it should be understood that numerous modifications may be made thereto without departing from the spirit and scope of the invention. It is intended that all such modifications fall within the scope of the appended claims.

The invention claimed is:

1. A system for controlling use of at least one resource, wherein the at least one resource is one of a physical workspace that is in part shared by at least two machines, control of an industrial process and a data object, the system comprising:
    a plurality of addressable locations in the system;
    a communication system connecting the addressable locations and transmitting communications between the addressable locations, the communication system having no inherent capability to provide mutually exclusive use of the at least one resource;
    controllers operably connected to respective ones of a plurality of machines or processes, the controllers being located with at least one of the addressable locations;
    a plurality of control programs operable at different addressable locations to request use of the at least one resource, at least one of the control programs operable to command one of the controllers; and
    a plurality of resource managers being located at different ones of the addressable locations, each resource manager communicating over the communication system with at least one other resource manager, and the plurality of resource managers working together over the communication system to arbitrate which one control program of the plurality of control programs is given exclusive use of the at least one resource during execution of the one control program, the one control program being given use of the at least one resource by a local resource manager at the same addressable location as the one control program.

2. A system in accordance with claim 1 wherein: the physical workspace is defined logically.

3. A system in accordance with claim 1 wherein:
    the at least one resource is control of an input/output function shared between the machines.

4. A system in accordance with claim 1 wherein:
    the at least one resource effects transport of items processed by the machines.

5. A system in accordance with claim 1 wherein:
    the at least one resource is control of exchange of tools used by the machines.

6. A system in accordance with claim 1 wherein:
    the at least one resource is control of processing performed at processing stations in a manufacturing process.

7. A system in accordance with claim 1 wherein:
    the at least one resource is control of a sensor system.

8. A system in accordance with claim 1 wherein:
    the control program is executed by a computer located at an addressable location in the system.

9. A system in accordance with claim 1 comprising:
    a human machine interface, coupled to at least one resource manager, which provides a point of access to the at least one resource manager, to permit establishing of the resources under control of the at least one resource manager, to observe the state of the resources under the control of the at least one resource manager and to modify the state of the resources under the control of the at least one resource manager.

10. A system in accordance with claim 9 wherein:
    the human machine interface is local to at least one of the resource managers.

11. A system in accordance with claim 9 wherein:
    the human machine interface has access to at least one resource manager through at least one other resource manager.

12. A system in accordance with claim 9 wherein:
    the human machine interface is remote from the at least one of the machines controlled by the at least one resource manager.

13. A system in accordance with claim 1 wherein:
    the control program includes user programmable instructions to the plurality of resource managers to control the state of the at least one resource.

14. The system of claim 1 wherein the communication system is not connected to the at least one shared resource.

15. A system for controlling use of at least one resource, wherein the at least one resource is one of a physical workspace that is in part shared by at least two machines, control of an industrial process and a data object, the system comprising:
    a plurality of addressable locations in the system;
    a communication system connecting the addressable locations and transmitting communications between the addressable locations, the communication system having no inherent capability to provide mutually exclusive use of the at least one resource;

controllers operably connected to respective ones of a plurality of machines or processes, the controllers being located with at least one of the addressable locations;

a plurality of control programs operable at different addressable locations to request use of the at least one resource, at least one of the control programs operable to command one of the controllers; and a plurality of resource managers being located at different ones of the addressable locations, each resource manager communicating over the communication system with at least one other resource manager, and the plurality of resource managers working together over the communication system to arbitrate which one control program of the plurality of control programs is given exclusive use of the at least one resource during execution of the one control program, the one control program being given use of the at least one resource by a resource manager at a different addressable location as the one control program.

16. A resource management system in accordance with claim 15 wherein the at least one resource further comprises one of control of an input/output function shared between the machines, control of transport of items processed by the machines, control of an exchange of tools used by the machines, control of processing performed at processing stations in a manufacturing process and control of a sensor system.

17. A system in accordance with claim 15 comprising:
a human machine interface, coupled to at least one resource manager, which provides a point of access to the at least one resource manager, to permit establishing of the resources under control of the at least one resource manager, to observe the state of the resources under the control of the at least one resource manager and to modify the state of the resources under the control of the at least one resource manager.

18. A system in accordance with claim 17 wherein the human machine interface is local to at least one of the resource managers, has access to at least one resource manager through at least one other resource manager, is remote from the at least one of the machines controlled by the at least one resource manager, or a combination thereof.

19. A system for controlling use of at least one resource, wherein the at least one resource is one of a physical workspace that is in part shared by at least two machines, control of an industrial process and a data object, the system comprising:
a plurality of addressable locations in the system;
a communication system connecting the addressable locations and transmitting communications between the addressable locations, the communication system having no inherent capability to provide mutually exclusive use of the at least one resource;
controllers operably connected to respective ones of a plurality of machines or processes, the controllers being located with at least one of the addressable locations;
a plurality of control programs operable at different addressable locations to request use of the at least one resource, at least one of the control programs operable to command one of the controllers;
a plurality of resource managers being located at different ones of the addressable locations, each resource manager communicating over the communication system with at least one other resource manager, and the plurality of resource managers working together over the communication system to arbitrate which one control program of the plurality of control programs is given exclusive use of the at least one resource during execution of the one control program;

each resource manager arbitrates access to a plurality of resources with access to the plurality of resources being in a set order;

each resource manager tracks each control program requesting control of the resources and in what order; and if a control program requests access to at least two resources out of the set order, a warning is issued that a deadlock between the control program requesting access to the at least two resources and another control program is possible.

20. A resource management system in accordance with claim 19 wherein the at least one resource further comprises one of control of an input/output function shared between the machines, control of transport of items processed by the machines, control of an exchange of tools used by the machines, control of processing performed at processing stations in a manufacturing process and control of a sensor system.

21. A system in accordance with claim 19 comprising:
a human machine interface, coupled to at least one resource manager, which provides a point of access to the at least one resource manager, to permit establishing of the resources under control of the at least one resource manager, to observe the state of the resources under the control of the at least one resource manager and to modify the state of the resources under the control of the at least one resource manager.

22. A system in accordance with claim 21 wherein the human machine interface is local to at least one of the resource managers, has access to at least one resource manager through at least one other resource manager, is remote from the at least one of the machines controlled by the at least one resource manager, or a combination thereof.

23. A system for controlling use of at least one resource, wherein the at least one resource is one of a physical workspace that is in part shared by at least two machines, a control of an industrial process and a data object, or the system comprising:
a plurality of addressable locations in the system;
a communication system connecting the addressable locations and transmitting communications between the addressable locations, the communication system having no inherent capability to provide mutually exclusive use of the at least one resource;
controllers operably connected to respective ones of a plurality of machines or processes, the controllers being located with at least one of the addressable locations;
a plurality of control programs operable at different addressable locations to request use of the at least one resource, at least one of the control programs operable to command one of the controllers; and
a plurality of resource managers being located at different ones of the addressable locations, each resource manager communicating over the communication system with at least one other resource manager, and the plurality of resource managers working together over the communication system to arbitrate which one control program of the plurality of control programs is given exclusive use of the at least one resource during execution of the one control program, the plurality of resource managers collaborate to determine if a set of machine control programs requesting access to a set of resources is found to form a deadlock and then the deadlock state is communicated to the user.

24. A resource management system in accordance with claim 23 wherein the at least one resource further comprises one of control of an input/output function shared between the machines, control of transport of items processed by the machines, control of an exchange of tools used by the machines, control of processing performed at processing stations in a manufacturing process and control of a sensor system.

25. A system in accordance with claim 23 comprising:
a human machine interface, coupled to at least one resource manager, which provides a point of access to the at least one resource manager, to permit establishing of the resources under control of the at least one resource manager, to observe the state of the resources under the control of the at least one resource manager and to modify the state of the resources under the control of the at least one resource manager.

26. A system in accordance with claim 25 wherein the human machine interface is local to at least one of the resource managers, has access to at least one resource manager through at least one other resource manager, is remote from the at least one of the machines controlled by the at least one resource manager, or a combination thereof.

27. A system for controlling use of at least one resource, wherein the at least one resource is one of a physical workspace that is in part shared by at least two machines, a control of an industrial process and a data object, the system comprising:
a plurality of addressable locations in the system;
a communication system connecting the addressable locations and transmitting communications between the addressable locations, the communication system having no inherent capability to provide mutually exclusive use of the at least one resource;
controllers operably connected to respective ones of a plurality of robots which use a plurality of workspaces which at least in part are located within a mutual workspace, the controllers being located with at least one of the addressable locations;
a plurality of control programs operable at different addressable locations to request use of the at least one resource, at least one of the control programs operable to command one of the controllers; and
a plurality of resource managers being located at different ones of the addressable locations, each resource manager communicating over the communication system with at least one other resource manager, and the plurality of resource managers working together over the communication system to arbitrate which one control program of the plurality of control programs is given exclusive use of the at least one resource during execution of the one control program.

28. A resource management system in accordance with claim 27 wherein the at least one resource further comprises one of control of an input/output function shared between the machines, control of transport of items processed by the machines, control of an exchange of tools used by the machines, control of processing performed at processing stations in a manufacturing process and control of a sensor system.

29. A system in accordance with claim 27 comprising:
a human machine interface, coupled to at least one resource manager, which provides a point of access to the at least one resource manager, to permit establishing of the resources under control of the at least one resource manager, to observe the state of the resources under the control of the at least one resource manager and to modify the state of the resources under the control of the at least one resource manager.

30. A system in accordance with claim 29 wherein the human machine interface is local to at least one of the resource managers, has access to at least one resource manager through at least one other resource manager, is remote from the at least one of the machines controlled by the at least one resource manager, or a combination thereof.

31. A system for controlling use of at least one resource, wherein the at least one resource is one of a physical workspace that is in part shared by at least two machines, control of an industrial process and a data object, the system comprising:
a plurality of addressable locations in the system;
a communication system connecting the addressable locations and transmitting communications between the addressable locations, the communication system having no inherent capability to provide mutually exclusive use of the at least one resource;
controllers operatively connected to respective ones of a plurality of machines or processes, the controllers being located with at least one of the addressable locations;
a group of control programs operable at different addressable locations to request use of the at least one resource and at least one of the control programs operable to command one of the controllers; and
a plurality of resource managers being located at different ones of the addressable locations, each resource manager communicating over the communication system with at least one other resource manager, such that the resource managers implement at least one interlock on behalf of the at least one resource, each interlock providing mutually exclusive use of the at least one resource by one of the control programs, each interlock being controlled by programmable instructions from within the one of the control programs.

32. A system in accordance with claim 31 wherein:
the instructions are user instructions.

33. A system for controlling use of a shared workspace comprising:
addressable locations in the system;
a communication system connecting the addressable locations and transmitting communications between the addressable locations, the communication system having no inherent capability to provide mutually exclusive use of the at least one resource;
at least two machines and associated controllers located with at least one of the addressable locations, the at least two machines sharing the workspace;
control programs operable at different addressable locations to request use of the shared workspace and at least one of the control programs operable to command one of the controllers; and
resource managers located with different ones of the plurality of the addressable locations, each resource manager communicating over the communication system with at least one other resource manager, and the resource managers working together over the communication system to arbitrate which one control program is given exclusive use of the shared workspace during execution of the one control program, the one control program being given use of the at least one resource by a resource manager at one of a common and a different addressable location as the one control program.

* * * * *